US011503005B2

(12) United States Patent
Schwindt

(10) Patent No.: US 11,503,005 B2
(45) Date of Patent: Nov. 15, 2022

(54) TOOL VERIFICATION SYSTEM AND METHOD OF VERIFYING AN UNQUALIFIED COMPONENT

(71) Applicant: GE Aviation Systems Limited, Cheltenham (GB)

(72) Inventor: Stefan Alexander Schwindt, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 166 days.

(21) Appl. No.: 16/660,055

(22) Filed: Oct. 22, 2019

(65) Prior Publication Data
US 2020/0153810 A1     May 14, 2020

Related U.S. Application Data

(60) Provisional application No. 62/758,008, filed on Nov. 9, 2018.

(51) Int. Cl.
| | | |
|---|---|---|
| *H04L 9/40* | (2022.01) | |
| *G06F 11/30* | (2006.01) | |
| *G06F 11/36* | (2006.01) | |
| *H04W 12/06* | (2021.01) | |

(52) U.S. Cl.
CPC .......... *H04L 63/08* (2013.01); *G06F 11/3013* (2013.01); *G06F 11/3664* (2013.01); *G06F 11/3688* (2013.01); *H04W 12/06* (2013.01); H04L 2209/80 (2013.01)

(58) Field of Classification Search
CPC .. H04L 63/08; H04L 2209/80; G06F 11/3013; G06F 11/3664; G06F 11/3688; G06F 8/70; G06F 11/3636; H04W 12/06
See application file for complete search history.

(56) References Cited

U.S. PATENT DOCUMENTS

| | | | |
|---|---|---|---|
| 6,883,121 B1* | 4/2005 | Jensen | G06F 11/0751 714/48 |
| 7,610,578 B1* | 10/2009 | Taillefer | G06F 8/30 717/124 |
| 8,930,912 B2 | 1/2015 | Andrews | |
| 9,225,720 B1* | 12/2015 | Chandrasekhar | H04L 67/1023 |
| 9,996,450 B2 | 6/2018 | Hotra et al. | |
| 2004/0185842 A1* | 9/2004 | Spaur | H04L 63/0823 455/420 |
| 2006/0056403 A1* | 3/2006 | Pleasant | G06F 1/14 370/389 |

(Continued)

FOREIGN PATENT DOCUMENTS

WO     20070567502     5/2007

OTHER PUBLICATIONS

European Patent Office, Extended Search Report re Patent Application No. 19207846.7-1224, dated Feb. 14, 2020, 9 pages, Munich, Germany.

*Primary Examiner* — Aravind K Moorthy
(74) *Attorney, Agent, or Firm* — McGarry Bair PC

(57) ABSTRACT

A tool verification system and a method of verifying an unqualified component includes receiving communications between a tool and an unverified component, comparing the communications with a previously-qualified set of communications, and determining whether the unqualified component can be qualified based on the comparison.

20 Claims, 5 Drawing Sheets

(56) References Cited

U.S. PATENT DOCUMENTS

| | | | |
|---|---|---|---|
| 2008/0025344 A1* | 1/2008 | Biederman | H04J 3/0697 370/498 |
| 2010/0049378 A1* | 2/2010 | Hiale-Guilhamou | G08G 5/0013 701/3 |
| 2010/0281107 A1* | 11/2010 | Fallows | H04L 67/42 709/203 |
| 2011/0071709 A1* | 3/2011 | Damiani | G06F 8/30 701/3 |
| 2011/0173184 A1* | 7/2011 | Kelshikar | G06F 16/2471 707/722 |
| 2011/0296379 A1* | 12/2011 | McCready | G06F 9/448 717/121 |
| 2012/0089360 A1* | 4/2012 | Chen | G06F 11/1441 702/119 |
| 2012/0278900 A1* | 11/2012 | Sebald | G06F 11/3604 726/28 |
| 2013/0003757 A1* | 1/2013 | Boatright | H04N 21/242 370/474 |
| 2013/0081001 A1 | 3/2013 | Bertan et al. | |
| 2013/0152047 A1* | 6/2013 | Moorthi | G06F 11/368 717/124 |
| 2013/0227367 A1* | 8/2013 | Czamara | G01R 31/3177 714/735 |
| 2013/0332932 A1* | 12/2013 | Teruya | G06F 9/54 718/102 |
| 2014/0005999 A1* | 1/2014 | Agarwala | G06F 30/33 703/14 |
| 2014/0019923 A1* | 1/2014 | Agarwala | G06F 30/33 716/104 |
| 2014/0100837 A1* | 4/2014 | Heinen | G06F 30/33 703/14 |
| 2014/0282488 A1* | 9/2014 | Tagliabue | G06F 11/07 717/174 |
| 2015/0079545 A1* | 3/2015 | Kurtz | G06F 21/32 434/30 |
| 2015/0205704 A1* | 7/2015 | Michelsen | G06F 11/3684 717/125 |
| 2015/0286552 A1* | 10/2015 | Michelsen | G06F 40/18 714/38.1 |
| 2015/0286560 A1* | 10/2015 | Michelsen | G06F 11/3696 714/38.1 |
| 2015/0317243 A1* | 11/2015 | Green | G06F 3/04842 714/38.1 |
| 2015/0347127 A1 | 12/2015 | Leibham et al. | |
| 2015/0370247 A1* | 12/2015 | Newell | G05B 19/41875 702/81 |
| 2015/0372884 A1* | 12/2015 | Baldwin | G06F 11/3476 709/224 |
| 2016/0004710 A1* | 1/2016 | Sekiguchi | G06F 16/122 707/694 |
| 2016/0062744 A1* | 3/2016 | Mair | G06F 8/70 717/109 |
| 2016/0062973 A1* | 3/2016 | Haines | G06F 40/174 715/224 |
| 2016/0224715 A1* | 8/2016 | Meyer | G06F 30/30 |
| 2016/0232084 A1* | 8/2016 | Bhat | G06F 11/3664 |
| 2017/0041126 A1* | 2/2017 | Bergeron | H04L 43/0858 |
| 2017/0168813 A1* | 6/2017 | Pogrebinsky | G06F 8/70 |
| 2017/0177249 A1* | 6/2017 | Kurilov | G06F 11/263 |
| 2017/0192873 A1* | 7/2017 | Ozdemir | G06F 8/658 |
| 2017/0212789 A1 | 7/2017 | Vega | |
| 2017/0235808 A1* | 8/2017 | Salame | H04L 67/1095 707/625 |
| 2017/0285104 A1* | 10/2017 | Bhamidipati | G01R 31/31724 |
| 2017/0286092 A1* | 10/2017 | Zhu | G06F 11/1469 |
| 2017/0310674 A1* | 10/2017 | Markham | B60R 16/0231 |
| 2017/0322868 A1 | 11/2017 | Hotra et al. | |
| 2017/0322870 A1* | 11/2017 | Hotra | G06F 11/3664 |
| 2017/0344449 A1* | 11/2017 | Tung | G06F 11/2236 |
| 2018/0293386 A1* | 10/2018 | Barouni Ebrahimi | H04L 67/02 |
| 2019/0171956 A1* | 6/2019 | Funakoshi | G06F 11/34 |
| 2019/0179736 A1* | 6/2019 | Sharma | G06F 8/38 |
| 2019/0187971 A1* | 6/2019 | Wang | H04W 12/06 |
| 2019/0266074 A1* | 8/2019 | Copty | G06F 11/3684 |
| 2020/0012587 A1* | 1/2020 | Girata, Jr. | G06F 11/3676 |

* cited by examiner

TOOL VERIFICATION SYSTEM AND METHOD OF VERIFYING AN UNQUALIFIED COMPONENT

CROSS REFERENCE TO RELATED APPLICATION(S)

This application claims priority to and benefit of U.S. Patent Application No. 62/758,008 filed Nov. 9, 2018, which is incorporated herein in its entirety.

BACKGROUND OF THE INVENTION

In a technical environment, such as within an avionics system for an aircraft, tools, software, and applications are qualified as part of a regulated operating environment. However, in some instances, updated or improved software or applications included as part of the system or tool are not qualified or otherwise requalified.

BRIEF DESCRIPTION

In one aspect, the present disclosure relates to a tool verification system, including a qualified tool, a test system having an unqualified component, the test system communicatively connected with the qualified tool, and a tool verification component configured to sense a set of communications between the qualified tool and the unqualified component, to compare the sensed set of communications with a predetermined set of communications between the qualified tool and a previously-qualified component, and determine a qualification decision for the unqualified component based on the comparison. The previously-qualified component is a prior version of the unqualified component.

In another aspect, the present disclosure relates to a method of verifying an unqualified component, the method including receiving, by a tool verification component, a set of communications between a previously-qualified tool and the unqualified component, comparing, by the tool verification component, the received set of communications with a predetermined set of communications between the previously-qualified tool and a previously-qualified version of the unqualified component, determining whether the unqualified component functionally operates in accordance with the previously-qualified version of the unqualified component, based on the comparing, and determining the unqualified component is a qualified component based on the determination that the unqualified component functionally operates in accordance with the previously-qualified version of the unqualified component.

DETAILED DESCRIPTION

Figure 1:
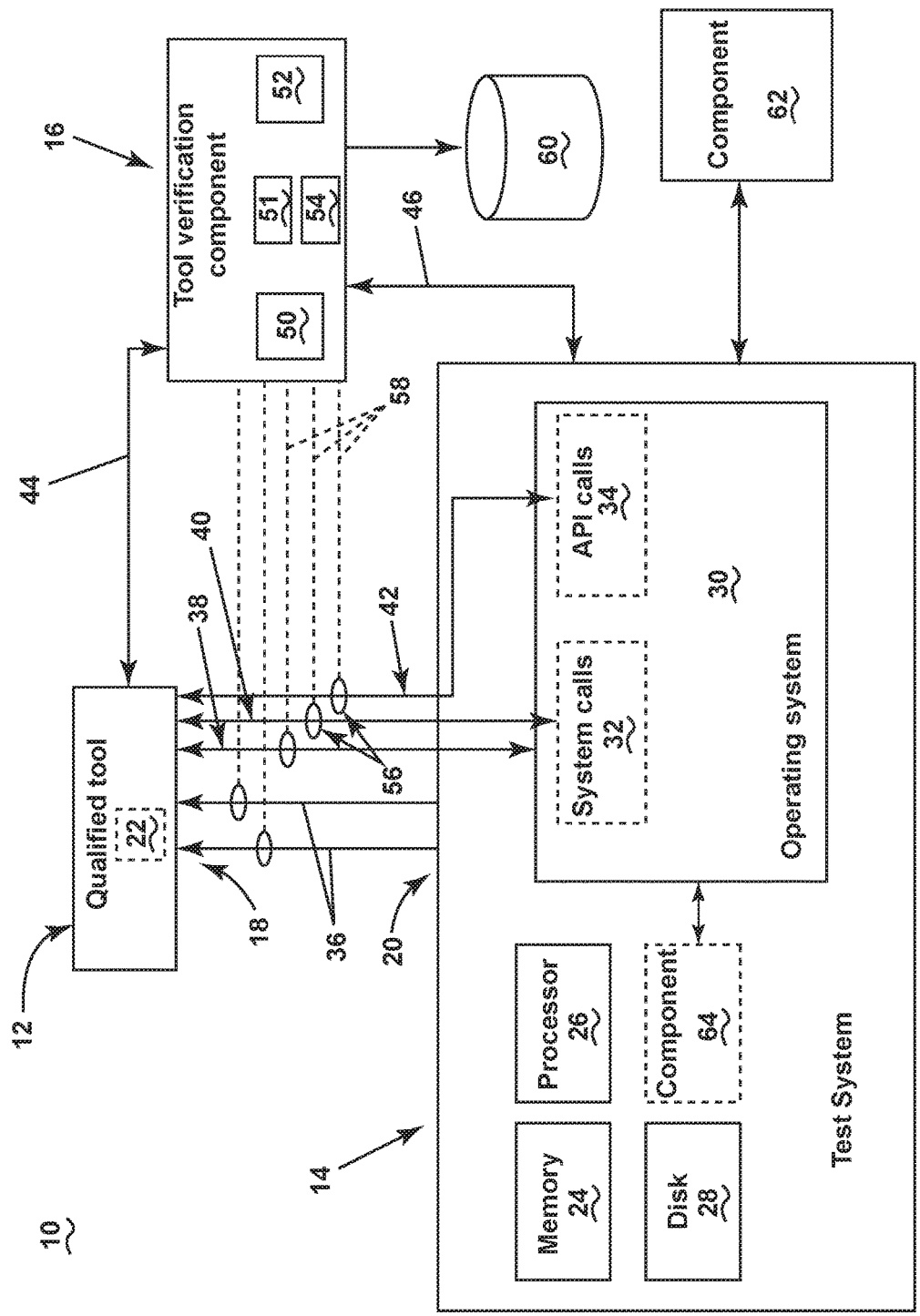
FIG. 1 illustrates a schematic view of a tool verification system, in accordance with various aspects described herein.

Aspects of the disclosure can be implemented in any environment, apparatus, system, avionics system, or method for verifying an unqualified tool, regardless of the function performed by the tool or system. For example, aspects of the disclosure can apply to additional systems or industries where system changes are impeded by testing or certification. Such additional industries can include, but are not limited to, healthcare industries or systems, chemical, manufacturing, processing and similar industries, banking industries or systems, transportation industries or systems, or the like.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Connection references (e.g., attached, coupled, connected, and joined) are to be construed broadly and can include intermediate members between a collection of elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Since many modern avionics systems are based primarily in software, special software certification requirements are required. The safety of software used in airborne avionics systems is guided by, for example, the European Aviation Safety Agency (EASA), or the Federal Aviation Administration (FAA). In one example, the EASA's application of the document ED-12C can provide guidance. In another example, the FAA's application of the document DO-178C, Software Considerations in Airborne Systems and Equipment Certification can guide certification requirements can provide guidance. This document is used for guidance to determine if given software will perform reliably in an airborne environment. The software level, also known as the design assurance level (DAL), is determined from the safety assessment process and hazard analysis by examining the effects of a failure condition in the particular system. The failure conditions are categorized by their effects on the aircraft, crew, and passengers, in descending order from A to E. In the following discussion, DAL A compliance will be referred to as "higher than" or "above" DAL B, C, D, and E compliance, while DAL B or DAL C compliance will be referred to as "under" or "below" DAL A compliance. Table 1 demonstrates DAL level, failure conditions, and failure effect on the aircraft.

TABLE 1

DAL Level and Failure Effects

| DAL Level | Failure condition | Failure Effect on Aircraft |
|---|---|---|
| A | Catastrophic | Failure conditions, which would result in multiple fatalities, usually with the loss of the airplane. |
| B | Hazardous | Failure conditions, which would reduce the capability of the airplane or the ability of the flight crew to cope with adverse operating conditions to the extent that there would be: A large reduction in safety margins or functional capabilities; Physical distress or excessive workload such that the flight crew cannot be relied upon to perform their tasks accurately or completely, or Serious or fatal injury to a relatively small number of occupants other than the flight crew. |
| C | Major | Failure conditions which would reduce the capability of the airplane or the ability of the crew to cope with adverse operating conditions to the extent that there would be, for example, a significant reduction in safety margins or functional capabilities, a significant increase in crew workload or in crew conditions impairing efficiency, or discomfort to the flight crew, or discomfort to the flight crew or physical distress to passengers or cabin crew, possibly including injuries. |
| D | Minor | Failure conditions which would not significantly reduce airplane safety, and which involve crew actions that are well within their capabilities. Minor failure conditions may include, for example, a slight reduction in safety margins or functional capabilities, a slight increase in crew workload, such as routine flight plan changes, or some physical discomfort to passengers or cabin crew. |
| E | No Effect | Failure conditions that would have no effect on safety; for example, failure conditions that would not affect the operational capability of the airplane or increase crew workload |

DO-178C alone is not intended to guarantee software safety aspects. Safety attributes in the design and as implemented as functionality must receive additional mandatory system safety tasks to drive and show objective evidence of meeting explicit safety requirements. These software safety tasks and artifacts are integral supporting parts of the process for hazard severity and DAL determination to be documented in system safety assessments (SSA). The certification authorities require and DO-178C specifies the correct DAL be established using these comprehensive analyses methods to establish the DAL level A-E. It is the software safety analyses that drive the system safety assessments that determine the DAL that drives the appropriate level of rigor in DO-178C. Furthermore, interactions between avionics systems of varying DAL levels must incorporate data and calculation integrity protections to ensure certified operational effectiveness. Therefore, DO-178C central theme is design assurance and verification after the prerequisite safety requirements have been established.

Demonstrating compliance or qualification with those regulations is an expensive process that includes simulations, flight testing, statistics, and analysis. In many instances, the costs of developing a DAL A compliant system versus a DAL B or C compliant system is dramatically more expensive and resource intensive. For example, the cost of developing a DAL A compliant flight guidance system is estimated as threefold more expensive than a DAL B or C compliant flight guidance system. Thus, the development costs of DO-178C compliant software increases with a higher DAL levels. While, for example, DAL E compliance may be less expensive than DAL A compliance, all qualification of compliant systems bear a cost. While DAL certification is described for understanding, any method, mechanism, testing strategy, or compliance qualifications, standards, or the like, can be employed in aspects of the disclosure. Tool qualification levels can be similar to the DAL levels described herein, and likewise increased rigour and thus cost for changes.

In the software and hardware development art, "tools" are the items of software or hardware used to develop or verify another product. The product being verified can be understood as a "unit under test" or "product," as used herein and corresponds to be software developed to DO-178C or hardware developed to DO-254. Additionally, a "qualified" tool is an item of software or hardware where the tool performs activities otherwise performed by a human by either producing a product (i.e. generates executable code from requirements) or verifying the product (i.e. static code analysis tool checking source code or a rig that checks system function). Tools are qualified using Tool Qualification Levels (TQL) in a process mirroring that for the airborne products. Thus the cost of qualifying TQL-1 tool is higher than for a TQL-5. The tool is qualified in a tool environment and any changes to the environment are deemed to impact the tool qualification.

Thus, a system that checks, verifies, validates, or otherwise qualifies the tool's interaction with its tool environment is referred to as a "tool verification system." In this sense, the tool verification system can be configured or operable to identify or "flag" if something relative to the environment has changed that would discount its qualification, such that the qualified tool would no longer be guaranteed to produce the same outputs. The tool environment is the operating system, other applications and hardware on which the tool runs.

The exemplary drawings are for purposes of illustration only and the dimensions, positions, order and relative sizes reflected in the drawings attached hereto can vary.

FIG. 1 illustrates a tool verification system 10 for a verification of interactions or communications between a tool, shown as a qualified tool 12, and a system, shown as a first test system 14. As used herein, a "qualified" tool 12 can include a physical or virtual tool that has been tested, verified, validated, or otherwise authorized or approved to operate in a specific tool environment or use. For example, aircraft and avionics system are regulated systems that require testing and validation of components prior to be placed into use on the aircraft. Testing and validation can include relatively simple and inexpensive procedures (as measured in time or currency values, such as dollars), complex and expensive procedures, or therebetween. For instance, while a voltage sensor may have less rigorous testing procedures to be "qualified" for aircraft or avionics system use, an autoland or autoflight software application can be subjected to highly rigorous testing procedures to ensure "qualified" compliance or capabilities for reliable aircraft or avionics use.

In some instances, the costs of developing, certifying, or otherwise qualifying a qualified tool 12 can include developing, certifying, or otherwise qualifying any underlying software or systems that the qualified tool 12 interacts with, communicates with, other otherwise operates relative to. For instance, in one non-limiting example, a qualified tool 12 can communicate with a communicatively connected computer system, such as the test system 14 (e.g. the tool environment, as described herein), during compliance qualifications. In qualifying the qualified tool 12, the qualified tool 12 is also qualified to reliably or certifiably interact with the test system 14, as needed during qualified tool 12 operations. It will be understood that while "qualified" is used to describe the qualified tool 12, the tool 12 (and any other tools) are "qualified" only within a specific environment of the test system 14, and are only considered "qualified" in this unchanged environment (e.g. only with respect to the particular test system 14). In the event of environmental changes, such as changes to the test system 14 (e.g. in an "unqualified" test system), the "qualified" tool 12 may not be strictly qualified. However, for brevity and ease of understanding, the qualified tool 12 will be referred to as "qualified" even when paired with an "unqualified" test system.

Over time, aspects of the software or systems the qualified tool 12 interacts with, communicates with, other otherwise operates relative to, can be updated. For example, updates to software or systems can include security updates, functionality updates, resolution or "fixing" of errors or computer "bugs," improved performance, or the like. In another example, old, legacy, obsolete, irreplaceable, or otherwise inoperable hardware can be replaced where original components (or originally qualified components) cannot be found, sourced, or otherwise reconditioned. However, due to the costs associated with certification or qualification of the qualified tool 12 (e.g. testing, retesting, regression testing, etc.), updates to the software or systems may not be included in avionics systems since they are not directly affecting the qualified tool 12. From a software perspective, updates to software can be desirable to ensure security, reliability, or the like, even when there may not be a direct impact on the operation of the qualified tool 12. Thus, it can be desirable to enable a mechanism or method for testing or verifying updated software that interacts with a qualified tool 12, while reducing the overall scope, scale, or costs for qualifying or certifying a new software version, or requalifying the same.

Thus aspects of the disclosure can be included wherein the tool verification system 10 can be utilized or employed to determine a qualification decision for an otherwise unqualified system component. In this sense, aspects of the disclosure can include an assessment of the interactions between the qualified tool 12 and an otherwise unqualified system component or environment to determine if anything has happened that will impact the qualified tool 12 so we either do not need to re-qualify or only partially re-qualify (regression testing of affected parts). This can further be enabled by operating the tool verification system 10 in two modes of operation: a first "learning" mode (illustrated in FIG. 1), and a second "supervisory" mode (illustrated in FIG. 2). FIG. 1 illustrates the tool verification system 10 having the qualified tool 12 in communication with the first test system 14, which can include a previously-qualified or previously-certified test system 14. As used herein, a previously-qualified test system 14 can include a test system 14 that has been previously concluded or predetermined to operate in accordance with the certification, qualification, approval, or otherwise authorized procedures for aircraft operations. Stated another way, the test system 14 can include or represent a qualified system for interacting with the qualified tool 12.

The qualified tool 12 can be communicatively connected with the test system 14 by a set of communication interfaces, show as a tool interface 18 and a test system interface 20, enabled to allow for or enable communication between the respective components. Non-limiting aspects of the set of interfaces 18, 20 can include physical interfaces, such as network interfaces, ports, connectors, buses, peripheral component interconnect (PCI) buses, wireless interfaces, or virtual interfaces such as software interfaces, virtualization interfaces, software partitioning, or the like. The qualified tool 12 is further shown having at least one software component 22, for example, adapted, configured, or otherwise enabled to provide for operation of the qualified tool 12.

The test system 14 is shown including memory 24, a processor 26, a data-storage device, such as a data disk 28, and an operating system 30. While memory 24 and a data disk 28 are shown, non-limiting aspects of the disclosure can include only one data storing components, such as the memory 24 or data disk 28. The operating system 30 can include any system for operation of the test system 14, including, but not limited to, Linux, Unix, Microsoft Windows, or the like. The operating system 30 can further include a set of system calls 32 and application programming interface (API) calls 34. As used herein, a "system call" 32 is a programmatic mechanism configured or adapted to provide or otherwise enable software or programs to interact with the operating system or kernel thereof. Example system calls can include, but are not limited to: process creation or management, main memory management, file access, directory system management, file system management, input/output device management, networking commands, or the like. An "API call" 34 is a programmatic mechanism configured or adapted to provide or otherwise enable a first software component or program to interact with another software component or program. Examples of API calls 34 can include exchanging data with a data server, performing routine programmatic functions such as math functions, or the like.

Typically, the set of system calls 32 and the set of API calls 34 are defined by the operating system 30, or software components thereof. For instance, system calls 32 and API calls 34 are not typically changed, introduced, or removed in a single version of an operation system 30 or software components thereof.

During operation of the qualified tool 12 and the previously-qualified or previously-certified test system 14, the qualified tool 12, or the at least one software component 22 thereof can interact with the test system 14, for example, by way of communications. In non-limiting examples, the communications can include communications 36 between the respective interfaces 18, 20, communications 38 between the qualified tool 12 and the operating system 30, communications 40 between the qualified tool 12 and the set or a subset of the system calls 32, communications 42 between the qualified tool 12 and the set or a subset of the API calls 34, or a combination thereof. In one non-limiting example, communications 38, 40, 42 can be effectively carried by way of the respective interfaces 18, 20, or communications 36 thereof.

Furthermore, during operation of the qualified tool 12 and the previously-qualified or previously-certified test system 14, the qualified tool 12, or the at least one software component 22 thereof can interact with additional system components, shown as a first real-world or real-time component 62, and also shown as a virtual component 64. As used herein, a "real-world" or "real-time" component 62 can include a physical component such as one found in a production environment. For example, in the non-limiting example of the qualified tool 12 including an autoland software program 22, real-word components can include flight management computers, terminals, sensors, pilot interactive devices (e.g. cockpit controls), or the like. As used herein, a "virtual" component 64 can include a simulated or approximated software component designed to function or otherwise operate or mimic the operation of a real-world or real-time component. For example, in a testing environment, wherein altitude is held steady, altitude sensor date can be generated by a "virtual" altitude sensor component 64. While only a single real-world and virtual components 62, 64 are shown, aspects of the disclosure can be included with any number of real-world components 62 or virtual components 64, including non-limiting aspects of only real-world components 62 or only virtual components 64.

The tool verification system 10 can further include a tool verification component 16, including a test set of procedures 50, a controller module 51, memory 52, and a high precision timer 54. As used herein, a "high precision" timer 54 can include a timer having a high resolution. For example, a high precision timer 54 can be used from within a virtual machine to see "real world" (e.g. one-to-one) clock times. In a virtual machine or simulated environment, the environment is virtualized so passage of time is an "apparent" passage of time. By communicating with an external clock, the real processing speed and timing can be found. For example, 10 microseconds in a virtual machine could be 1 microsecond in "real world" clock time. In one non-limiting example, the tool verification component 16 can be communicatively connected with the qualified tool 12 by way of a first communication line 44, and can be communicatively connected with the previously-qualified or previously-certified test system 14 by way of a second communication line 46. In another non-limiting example, the tool verification component 16, or memory 52 thereof, can be communicatively connected with a data storage device 60.

The tool verification component 16 can be configured or adapted to operably control the qualified tool 12, the previously-qualified test system 14, or a combination thereof, by way of the communication lines 44, 46. In one non-limiting example, the tool verification component 16 can be adapted to execute particular operations of the qualified tool 12, the previously-qualified test system 14, or a combination thereof. In another non-limiting example, the execution of particular operations of the qualified tool 12, the previously-qualified test system 14, or a combination thereof can be directed based on the test set of procedures 50. In this sense, the test set of procedures 50 can be delivered, communicated, or otherwise demanded from the qualified tool 12 or the previously-qualified test system 14. In one non-limiting example, the test set of procedures 50 can be executed or controlled by way of the controller module 51.

The tool verification component 16 can further be configured or adapted to obtain, sense, measure, receive, or otherwise record data or a set of data related to the execution of the test set of procedures 50 by the qualified tool 12 and the previously-qualified test system 14. For instance, as shown, the tool verification component 16 can include a set of signal sensors 56 configured or adapted to sense or measure the communications 36, 38, 40, 42. Any signal sensor 56 enabled to sense, measure, receive, or the like, a communication between respective components can be included. In one non-limiting instance, the signal sensor 56 can be configured to sense that a signal is present, or can be configured to sense the precise data signal delivered or communicated. In another non-limiting instance, the signal sensor 56 can be a software component, as opposed to a physical component.

In this sense, the communications 36, 38, 40, 42 of the qualified tool 12 and previously-qualified test system 14 can be indicative or representative of the qualified or certified operation of the qualified tool 12 relative to the test system 14. In one example, the sensed or measured communications 36, 38, 40, 42 can be provided, supplied, delivered, or the like to the tool verification component 16 by way of a set of communication lines 58, whereupon receiving the sensed or measured communications 36, 38, 40, 42, the sensed or measured values are time stamped with a time received from the high precision timer 54, and saved or stored in memory 52, or saved or stored in the data storage device 60.

By saving or storing the sensed or measured communications 36, 38, 40, 42, including a precise time stamp, the tool verification system 10 or the tool verification component 16 can accurately record and save a set of communications that are indicative or representative of the qualified tool 12 and the previously-qualified test system 14. Stated another way, while the tool verification system 10 or the tool verification component 16 does not execute and record typical operation of the tool (e.g. effective or function operations, whatever they may be), the tool verification system 10 or the tool verification component 16 records and stores data related to the precise (and time stamped) communications between the qualified tool 12 and the previously-qualified test system 14. In another instance, the recorded and stored data be indicative of qualified or certified operations of the qualified tool 12 and the previously-qualified test system 14.

The operations and description of the qualified tool 12 and the previously-qualified test system 14 of FIG. 1 relate to the first "learning" mode of operation of the tool verification system 10. In this mode, the tool verification system 10 or the tool verification component 16 can be understood to be "learning" about the communications indicative of qualified or certified operations of the qualified tool 12 and the previously-qualified test system 14.

Figure 2:
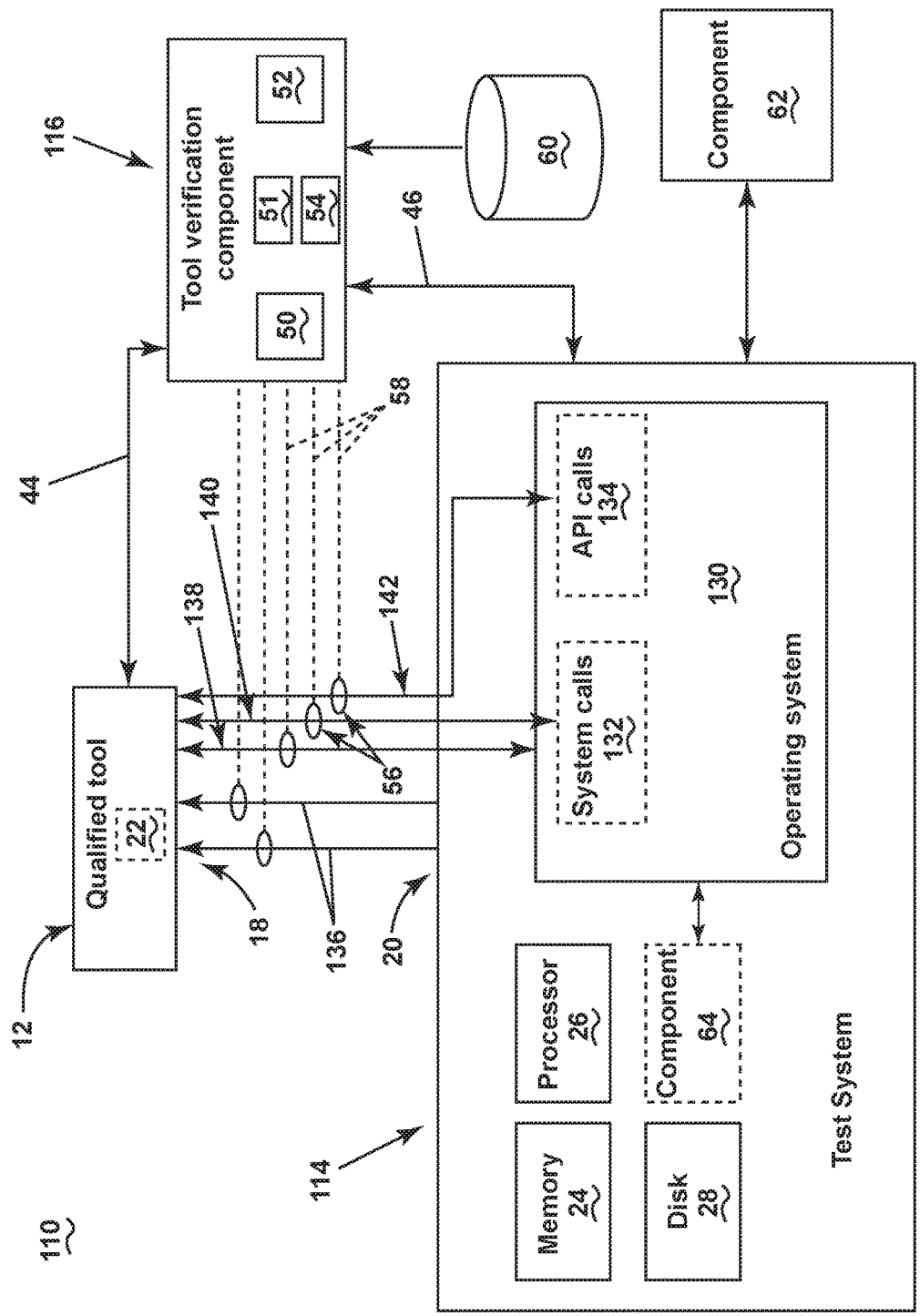
FIG. 2 illustrates a schematic view of a tool verification system of FIG. 1, operating in another operating mode, in accordance with various aspects described herein.

FIG. 2 illustrates another tool verification system 110 according to another aspect of the present disclosure. The tool verification system 110 is similar to the tool verification system 10; therefore, like parts will be identified with like numerals increased by 100, with it being understood that the description of the like parts of the tool verification system 10 applies to the tool verification system 110, unless otherwise noted. One difference is that the aspects of the disclosure in FIG. 2 include a second test system 114 that can include a non-qualified, uncertified, or similar component (e.g. an unqualified tool environment or the "unit under test"). For example, in one non-limiting instance, the second test system 114 can include a different operation system 130, such as an operating system 130 similar to the operating system 30 of FIG. 1, but with any number of updates, bug fixes, security enhancements, or the like. Stated another way, the operating system 130 can be an updated security system 30, where core or essential functionality is unchanged. In this sense, it may be desirable to incorporate updates, bug fixes, security enhancements, or the like, in a production environment (such as an avionics system or aircraft), without any changes or updates made to the qualified tool 12. However, as previously described, full recertification of the test system 114, operating system 130, or the like, can be costly. While the unqualified component is described and shown as the operating system 130, non-limiting aspects of the disclosure can be included wherein any underlying component, system, operation, functionality, or the like can be an unqualified tool. For instance, in a custom configured system, updates to the system calls 132 or API calls 134 can individually be considered unqualified tools, applicable for aspect of the disclosure.

Additional non-limiting examples of changes to the test 114 can include, but are not limited to processor 26 changes (or a different processor 26 altogether) that the tool runs on, but operates in accordance with different processor model or instruction sets, processor 26 or operating system 130 changes for a different model with a different representation in memory 24 (e.g. big endian versus little endian), physical media changes in the disk 28 (e.g. a different size hard drive or a change to the type of media such as from spinning hard disk drive to a solid state drive), when the tool is a virtual machine, moving the virtual machine to another test system 114, when the tool is moved from being hosted directly on hardware to being hosted on a virtual machine, interface changes such as test system interfaces 20, ARINC 429 card on a Peripheral Component Interconnect (PCI) bus to a universal serial bus (USB) interface, or the like.

Aspects of the disclosure can be included wherein the test verification system 110 or the test verification component 116 can be operated to identify, determine, estimate, or otherwise establish whether an otherwise unqualified component, such as the operating system 130 is compatible with the otherwise qualified tool 12. Such identification, determination, estimation, or establishing can be based on, for example, a comparison of the communications between the qualified tool 12 and the unqualified component, the second test system 114, or the like.

For example, as described with respect to FIG. 1, the memory 52 or the data storage device 60 can store a set of sensed or measured communications 36, 38, 40, 42 between a known, predetermined, pre-established, previously-qualified, or previously-certified qualified tool 12 and qualified test system 14. The same stored set of sensed or measured communications 36, 38, 40, 42 can be recalled by the memory 52 or the data storage device 60 in the tool verification component 116. In this sense, the tool verification component 116 can be communicatively connected with the qualified tool 12 by way of the first communication line 44, and can be communicatively connected with unqualified test system 114 by way of the second communication line 46. The tool verification component 116 can again be configured or adapted to operably control the qualified tool 12, the unqualified test system 114, or a combination thereof, by way of the communication lines 44, 46, such as being adapted to execute particular operations of the qualified tool 12, based on the test set of procedures 50. It is noted that the test set of procedures 50 can be consistent or the same as the test set of procedures 50 executed with respect to FIG. 1. In this sense, the test set of procedures 50 can be delivered, communicated, or otherwise demanded from the qualified tool 12 or the unqualified test system 114. In one non-limiting example, the test set of procedures 50 can be executed or controlled by way of the controller module 51. In another non-limiting example, the tool verification component 116 can be configured or adapted to operably control the unqualified test system 114 as needed to best approximate the production environment, or the previously-qualified test system 14. For instance, non-limiting aspects of the tool verification component 116 can operably control the unqualified test system 114 processor speed, virtualized hardware environment, etc.

In a similar way, the tool verification component 116 can obtain, sense, measure, receive, or otherwise record data or a set of data related to the execution of the test set of procedures 50 by the qualified tool 12 unqualified test system 114. Thus, in a similar mode of operation, the set of signal sensors 56 configured or adapted to sense or measure the set of communications 136, 138, 140, 142, which are the respective communications 136 between interfaces 18, 20, communications 138 between the qualified tool 12 and the unqualified operating system 130, communications 140 between the qualified tool 12 and the set or a subset of the unqualified system calls 132, communications 142 between the qualified tool 12 and the set or a subset of the unqualified API calls 134, or a combination thereof. While communications 136, 138, 140, 142 are shown and described, additional communications, or data related to communications, can be included.

In this sense, the set of communications 136, 138, 140, 142 of the qualified tool 12 and unqualified test system 114 can be indicative or representative of whether the interaction or operation of the qualified tool 12 and the unqualified test system 114 can be determined, qualified, verified or otherwise certified, based on the comparison of the set of communications 136, 138, 140, 142 with the set of communications 36, 138, 140, 142 of a qualified test system 14. For instance, the tool verification component 116 can save or store the set of communications 136, 138, 140, 142, including precise time stamps thereof, and, by way of the controller module 51, compare the multiple sets of communications 36, 38, 40, 42, 136, 138, 140, 142 to determine whether they "align."

In non-limiting examples, "align," "aligning," or "alignment" of the set of communications 36, 38, 40, 42 of the qualified test system 14 and the communications 136, 138, 140, 142 of the unqualified test system 114 can be defined based on, for instance, common precision timers for similar or comparable communication (e.g. initiated communication, terminated communication, length between initiation and termination of communications), similar or comparable content of communications (e.g. were the same messages or data communicated in each direction), whether communication content was properly received and responded to, as expected (e.g. whether system calls 132, API calls 134, and the like, utilized in similar fashion, including data or message characteristics, timing considerations, and the like).

Furthermore, additional considerations in determining a qualification decision can be included. For example, in a non-time sensitive qualified tool 12 applications, latency may not be of concern, so long as it is within a wide predetermined latency range. Thus, in instances where the communications 136, 138, 140, 142 between the qualified tool 12 and the unqualified test system 114 are not time-sensitive, difference in the comparison or in determining the qualification decision can ignore difference in the precision time stamps. Conversely, in time-critical qualified tool 12 applications, a difference in the comparison or in determining the qualification decision can be based, for instance primarily, on establishing similar or comparable latencies.

In another non-limiting instance, additional considerations in determining a qualification decision can be based on whether the system calls 132 or API calls 134 utilized by the qualified tool 12 are still present and accessible by the updated operating system 130, updated set of system calls 132, or updated set of API calls 134. Thus, aspects of the disclosure can base the determining of the qualification decision based on any combination of hardware parameters, software parameters, transactional parameters (e.g. the communications), or a combination thereof.

In yet another non-limiting instance, additional considerations in determining a qualification decision can be based on the impact of faster or slower execution of different processors 26, different accuracy of calculation or instructions not running prior to execution of a virtual machine process, different interpretation of data leading to misleading or incorrect calculations (e.g. big endian versus little endian), read and write access latencies or disk capacity requirements based on disk 28 changes, or communication latency, such as when changes to interfaces 20 occur.

In this sense, the tool verification system 110 or the tool verification component 116 can operate in the "supervisory" mode of FIG. 2, wherein the tool verification component 116 supervises the operation of the qualified tool 12 relative to the unqualified test system 114, and based on the comparison of the communications in the supervisory mode, makes a determination or decision on whether the updated or otherwise unqualified test system 114 should, could, or is qualifiable, certifiable, or even qualified or certified. Thus non-limiting aspects of the disclosure can be included wherein an apparatus or method of operating a the tool verification system 110 or the tool verification component 116 can determine a qualification decision for a unqualified test system 114, such that the unqualified test system 114, similar but updated or enhanced compared with the previously-qualified test system 14, can be implemented in a production environment, aircraft, or avionics system, without having to go through a full qualification process.

Aspects of the disclosure can be further applied in instances wherein older, legacy hardware is not available to component manufacturers, wherein obsolete hardware is virtualized in newer hardware, or wherein underlying hardware or software changes are desired for updates, bug fixes, security enhancements, or the like, to improve the overall operation of the qualified tool 12 environment.

Furthermore, while aspects of the disclosure describe the set of signal sensors 56 as adapted to sense or measure the set of communications 136, 138, 140, 142 between interfaces 18, 20, non-limiting aspects of the disclosure can be included wherein the set of signal sensors 56 can include a set of input/output signal sensors 56. The set of input/output sensors 56 can be further configured or adapted to not only sense the set of communications 136, 138, 140, 142, but also to provide, supply, or otherwise inject signals into the set of communications 136, 138, 140, 142. In this sense, non-limiting aspects of the disclosure can be included wherein the tool verification component 116 can enable the controlled execution of particular operations of the qualified tool 12, the test system 114, or a combination thereof, by actively providing signals in order to sense or record the responses to those signals. For example, the tool verification component 116 can supply a set of interruptive testing signals selected to trigger or execute system, API, or other "interrupt" actions, as understood in software testing. In this sense, the tool verification component 116 can execute controlled operations passively (by sensing the set of communications 136, 138, 140, 142) or actively (by injecting known interrupt signals and sensing the set of communications 136, 138, 140, 142 in response to the interrupt signals). Furthermore, non-limiting aspects of the "active" testing described can further be included with respect to the aspects of the "learning" mode of FIG. 1, recorded, and compared with the results of the aspects of the "supervisory" mode of FIG. 2, as described herein.

Figure 3:
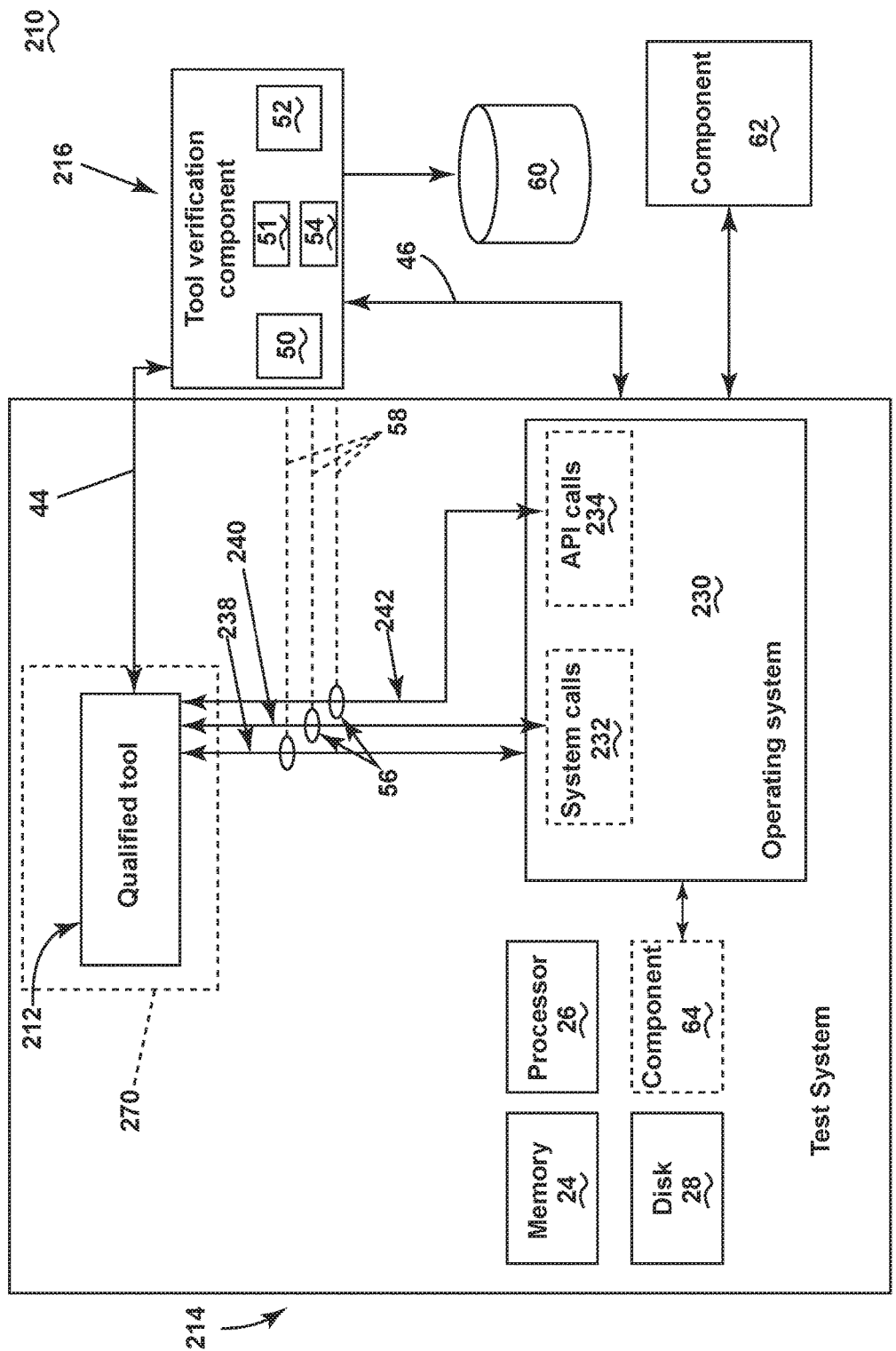
FIG. 3 illustrates schematic view of another tool verification system, in accordance with various aspects described herein.

FIG. 3 illustrates another tool verification system 210 according to another aspect of the present disclosure. The tool verification system 210 is similar to the tool verification system 10 of FIG. 1 (operating in "learning" mode); therefore, like parts will be identified with like numerals increased by 200, with it being understood that the description of the like parts of the tool verification system 10 applies to the tool verification system 210, unless otherwise noted. One difference is that the aspects of the disclosure in FIG. 3 are included wherein the qualified tool 212 can include a qualified software tool 212, compared with a separate interfaceable qualified tool 12 of FIG. 1. In another non-limiting example, the qualified software tool 212 of FIG. 3 can exists as a separate partition 270. In yet another non-limiting example, no hardware interfaces are included in the aspects of the disclosure of FIG. 3.

Figure 4:
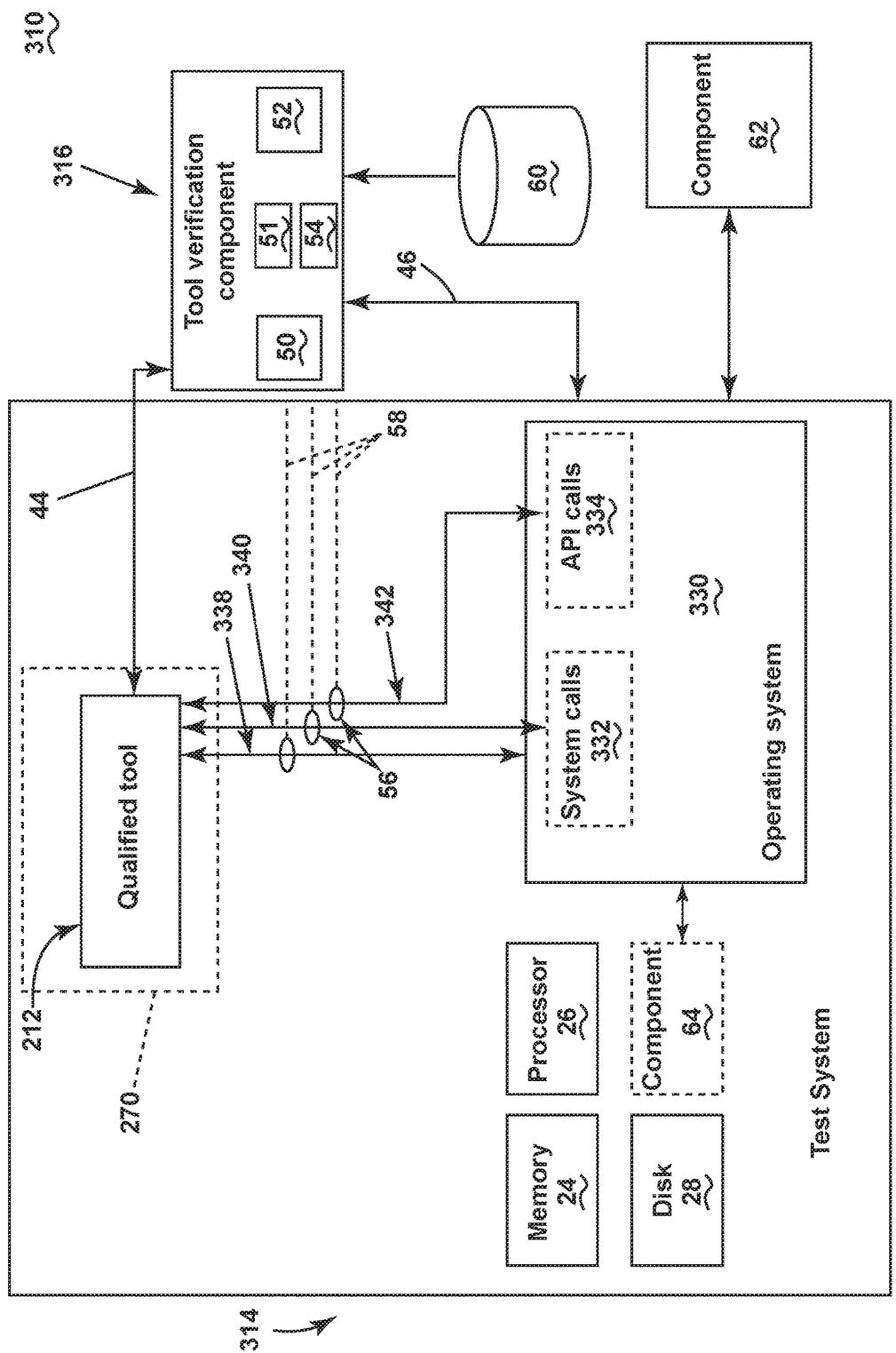
FIG. 4 illustrates a schematic view of the another tool verification system of FIG. 3, operating in another operating mode, in accordance with various aspects described herein.

Similarly, FIG. 4 illustrates another tool verification system 310 according to another aspect of the present disclosure. The tool verification system 310 is similar to the tool verification system 110 of FIG. 3 (e.g. wherein the qualified tool 212 can include an unqualified software tool 314; e.g. an unqualified tool environment or the "unit under test"), as well as aspects of FIG. 2 (the tool verification component 316 operating in "supervisory" mode); therefore, like parts will be identified with like numerals increased by 300, with it being understood that the description of the like parts of the tool verification system 110 applies to the tool verification system 310, unless otherwise noted.

Figure 5:
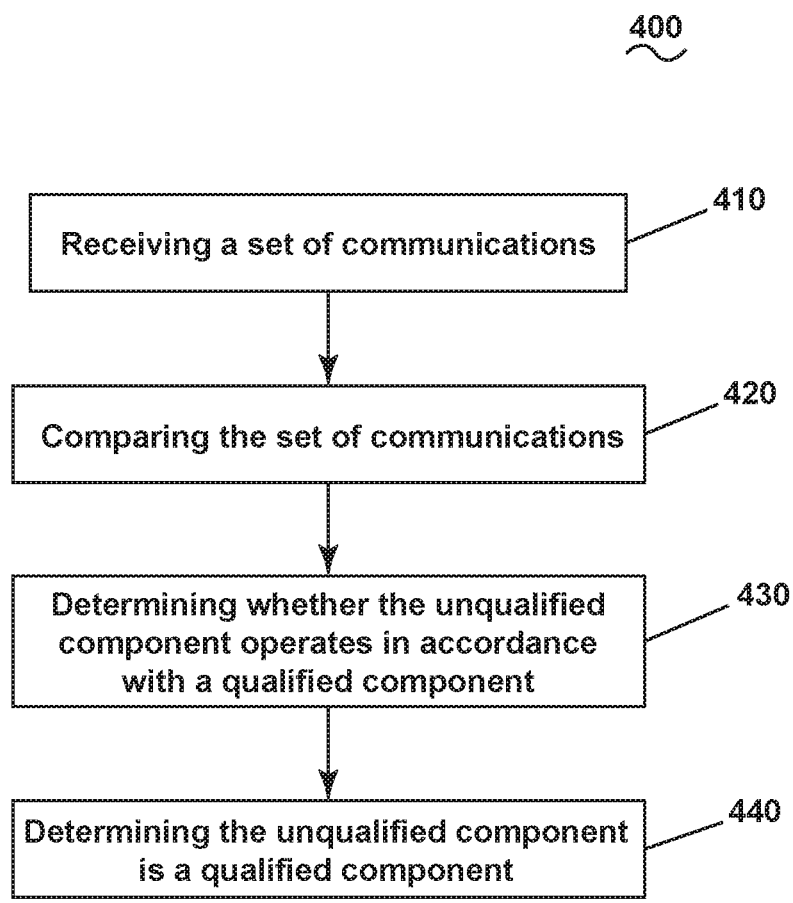
FIG. 5 is an exemplary method flowchart diagram of demonstrating a method of verifying an unqualified component, in accordance with various aspects described herein.

FIG. 5 illustrates a flow chart demonstrating a method 400 of verifying an unqualified component. The method 400 begins by receiving, by the tool verification component 116, 316, a set of communications 136, 138, 140, 142, 338, 340, 342 between the previously-qualified tool 12, 212 and the unqualified component, at 410. Next, the method 400 can include comparing, by the tool verification component 116, 316, the received set of communications 136, 138, 140, 142, 338, 340, 342 with a predetermined set of communications 36, 38, 40, 42, 238, 240, 242 between the previously-qualified tool 12, 212 and a previously-qualified version of the unqualified component, at 420.

Then the method 400 can include determining whether the unqualified component functionally operates in accordance with the previously-qualified version of the unqualified component, based on the comparing, at 430. Finally, the method 400 proceeds to determining the unqualified component is a qualified component based on the determination that the unqualified component functionally operates in accordance with the previously-qualified version of the unqualified component, at 440. In this sense, the determination that the unqualified (or previously unqualified component, at the start of the method 400) is a qualified component can include assigning a qualified or otherwise certified status, implementing or installing upgrades to the production environment, aircraft, avionics system, or the like, based on the qualified status, or upgrading the previously-qualified component to the recently or newly qualified component, as needed. In non-limiting examples, maintenance requests can be generated, implemented, executed, or the like to provide the implementing, installation, or upgrading activities.

Additional non-limiting aspects of the method 400 can be included in aspects of the disclosure. For example, the comparing can further include identifying communications present in the predetermined set of communications that are absent from the received set of communications. In another non-limiting example, identifying absent communications includes identifying system call communications, API call communications, or a combination thereof. In yet another non-limiting example, the method 400 can include time-stamping the set of communications by the high precision timer 54, as each of the set of communications is received by the tool verification component 116, 316.

Non-limiting aspects of the method 400 can further include comparing the time-stamping of the received set of communications with a time-stamp of the predetermined set of communication. In another non-limiting aspect, determining whether the unqualified component functionally operates in accordance is further based on the comparing of the time-stamping of the received set of communications with a time-stamp of the predetermined set of communication. The method 400 can further optionally include implementing the qualified component into a production environment based on the qualified determination, or upgrading the previously-qualified version of the unqualified component in a production environment to the qualified component based on the qualified determination. In this example, the unqualified component can include an upgraded software version.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, while the tool verification component 16, 116, 216, 316 is shown apart or separate from the respective test systems 14, 114, 214, 314, non-limiting aspects of the disclosure can be included wherein the respective test system 14, 114, 214, 314 contains, includes, or otherwise includes and operates the tool verification component 16, 116, 216, 316.

For example, in one non-limiting instance, at least one of the respective test system 14, 114, 214, 314 or tool verification component 16, 116, 216, 316 can additionally or alternatively be configured or adapted to identify, sense, detect, or otherwise flag changes or modifications to the qualified tool 12 or the at least one software component 22 by way of identifying changes in the software components thereof. For example, at least one of the respective test system 14, 114, 214, 314 or tool verification component 16, 116, 216, 316 can be adapted to perform a cryptographic hash has on the executable software, files, or the like, and compare that cryptographic hash with a predetermined qualified tool or software component. Any differences between the qualification tool 12 or the at least one software component 22 can be identified by the comparison of hashes (the comparison not necessarily identifying what the difference is, but merely that a difference exists). This comparison can be future utilized, or alternatively utilized, by the systems described herein, in such a way for the tool verification system 10 or the tool verification component 16 to identify, determine, estimate, or otherwise establish whether an otherwise unqualified component, such as the operating system 130 is compatible with the otherwise qualified tool 12, as described herein.

The aspects disclosed herein provide a system and method for verifying an unqualified component. The technical effect is that the above described aspects enable certification or verification of an otherwise unqualified component that is merely an improvement, upgrade, enhancement, or incremental advance of the unqualified component, compared to a previously-qualified similar component. In the software example, bug fixes, improvements, security enhancements, or the like are regularly iterated into upgraded or improved software versions, yet those improved software versions may not be implemented in a qualified or certified environment due to the costs of recertifying or requalifying the upgrade.

One advantage that can be realized in the above aspects is that the above described aspects provide for an ability, system, or component to validate or otherwise qualify such upgrades or improves by way of verifying the general or functional operation of the upgrades do not impact the performance or function of the qualified or certified system (e.g. to validate they do no negatively impact qualification or conformance to the qualified performance), without have to recertify all aspects of the system. Thus, aspects of the disclosure can operate to captures and measures relevant parameters to qualification that can indicate issues with tool behavior if changed. Another advantage of the disclosure can include improving or increasing functionality or operational security for qualified systems, including but not limited to, access security, virus detection, attack resistance, or overall reliability of qualified systems, where the improvements come from issued bug fixes or the like. Yet another advantage can include increasing the compliance of legacy systems that otherwise would have been discontinued or replaced due to end of life considerations. Yet another advantage is dramatically reducing full re-qualification or re-conformance costs of testing or implementing the improved or upgraded component.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

1. A tool verification system, comprising a qualified tool, a test system having an unqualified component, the test system communicatively connected with the qualified tool, and a tool verification component configured to sense a set of communications between the qualified tool and the unqualified component, to compare the sensed set of communications with a predetermined set of communications between the qualified tool and a previously-qualified component, and determine a qualification decision for the unqualified component based on the comparison, wherein the previously-qualified component being a prior version of the unqualified component.

2. The tool verification system of any preceding clause wherein the set of communications includes system call communications.

3. The tool verification system of any preceding clause wherein the tool verification component is configured to determine a qualification decision for the unqualified component based on an absence of system call communications from the predetermined set of communications but absent in the sensed set of communications.

4. The tool verification system of any preceding clause wherein the set of communications include application programming interface (API) call communications.

5. The tool verification system of any preceding clause wherein the tool verification component is configured to determine a qualification decision for the unqualified component based on an absence of API call communications from the predetermined set of communications but absent in the sensed set of communications 6. The tool verification system of any preceding clause wherein the tool verification component further comprises a precision timer.

7. The tool verification system of any preceding clause wherein the tool verification component is further configured to time stamp each of the sensed set of communications, at the time of sensing, with a time from the precision timer.

8. The tool verification system of any preceding clause wherein the tool verification component further comprises a set of test procedures executable by at least one of the qualified tool or the unqualified component.

9. The tool verification system of any preceding clause wherein the predetermined set of communications between the qualified tool and a previously-qualified component are based on a prior qualified execution of the set of test procedures executed by at least one of the qualified tool or the previously-qualified component.

10. The tool verification system of any preceding clause wherein the tool verification component further comprises a precision timer configured to time stamp each of the sensed set of communications, at the time of sensing, with a time from the precision timer, and wherein the tool verification component is configured to compare the sensed set of communications with a predetermined set of communications between the qualified tool and a previously-qualified component based on the time stamp of the sensed set of communications.

11. A method of verifying an unqualified component, the method comprising, receiving, by a tool verification component, a set of communications between a previously-qualified tool and the unqualified component, comparing, by the tool verification component, the received set of communications with a predetermined set of communications between the previously-qualified tool and a previously-qualified version of the unqualified component, determining whether the unqualified component functionally operates in accordance with the previously-qualified version of the unqualified component, based on the comparing, and determining the unqualified component is a qualified component based on the determination that the unqualified component functionally operates in accordance with the previously-qualified version of the unqualified component.

12. The method of any preceding clause wherein comparing further comprises identifying communications present in the predetermined set of communications that are absent from the received set of communications.

13. The method of any preceding clause wherein identifying communications includes identifying system call communications.

14. The method of any preceding clause wherein identifying communications includes identifying API call communications.

15. The method of any preceding clause, further comprising time-stamping the set of communications by a precision timer, as each of the set of communications is received by the verification component.

16. The method of any preceding clause wherein comparing further comprises comparing the time-stamping of the received set of communications with a time-stamp of the predetermined set of communication.

17. The method of any preceding clause wherein determining whether the unqualified component functionally operates in accordance is further based on the comparing of the time-stamping of the received set of communications with a time-stamp of the predetermined set of communication.

18. The method of any preceding clause, further comprising implementing the qualified component into a production environment based on the qualified determination.

19. The method of any preceding clause, further comprising upgrading the previously-qualified version of the unqualified component in a production environment to the qualified component based on the qualified determination.

20. The method of any preceding clause wherein the unqualified component is an upgraded software version.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tool verification system for an avionics system, comprising:
    a qualified tool configured to be used to generate at least a portion of the avionics system;
    a test system having an unqualified component configured to be used with the avionics system, the test system communicatively connected with the qualified tool; and
    a tool verification component configured to sense a set of communications between the qualified tool and the unqualified component, to compare the sensed set of communications with a predetermined set of communications between the qualified tool and a previously-qualified component, and determine a qualification decision for the unqualified component based on the comparison;
    wherein the previously-qualified component being a prior version of the unqualified component.

2. The tool verification system of claim 1 wherein the set of communications includes system call communications.

3. The tool verification system of claim 2 wherein the tool verification component is configured to determine a qualification decision for the unqualified component based on an absence of system call communications from the predetermined set of communications but absent in the sensed set of communications.

4. The tool verification system of claim 1 wherein the set of communications include application programming interface (API) call communications.

5. The tool verification system of claim 4 wherein the tool verification component is configured to determine a qualification decision for the unqualified component based on an absence of API call communications from the predetermined set of communications but absent in the sensed set of communications.

6. The tool verification system of claim 1 wherein the tool verification component further comprises a precision timer.

7. The tool verification system of claim 6 wherein the tool verification component is further configured to time stamp each of the sensed set of communications, at the time of sensing, with a time from the precision timer.

8. The tool verification system of claim 1 wherein the tool verification component further comprises a set of test procedures executable by at least one of the qualified tool or the unqualified component.

9. The tool verification system of claim 8 wherein the predetermined set of communications between the qualified tool and a previously-qualified component are based on a prior qualified execution of the set of test procedures executed by at least one of the qualified tool or the previously-qualified component.

10. The tool verification system of claim 1 wherein the tool verification component further comprises a precision timer configured to time stamp each of the sensed set of communications, at the time of sensing, with a time from the precision timer, and wherein the tool verification component is configured to compare the sensed set of communications with a predetermined set of communications between the qualified tool and a previously-qualified component based on the time stamp of the sensed set of communications.

11. A method of verifying an unqualified component configured to be used with an avionics system, the method comprising:
  receiving, by a tool verification component, a set of communications between a previously-qualified tool configured to be used with the avionics system and the unqualified component;
  comparing, by the tool verification component, the received set of communications with a predetermined set of communications between the previously-qualified tool and a previously-qualified version of the unqualified component;
  determining whether the unqualified component functionally operates in accordance with the previously-qualified version of the unqualified component, based on the comparing; and
  determining the unqualified component is a qualified component based on the determination that the unqualified component functionally operates in accordance with the previously-qualified version of the unqualified component.

12. The method of claim 11 wherein comparing further comprises identifying communications present in the predetermined set of communications that are absent from the received set of communications.

13. The method of claim 12 wherein identifying communications includes identifying system call communications.

14. The method of claim 12 wherein identifying communications includes identifying API call communications.

15. The method of claim 11, further comprising time-stamping the set of communications by a precision timer, as each of the set of communications is received by the tool verification component.

16. The method of claim 15 wherein comparing further comprises comparing the time-stamping of the received set of communications with a time-stamp of the predetermined set of communication.

17. The method of claim 16 wherein determining whether the unqualified component functionally operates in accordance is further based on the comparing of the time-stamping of the received set of communications with a time-stamp of the predetermined set of communication.

18. The method of claim 11, further comprising implementing the qualified component into a production environment based on the determination that the unqualified component is qualified.

19. The method of claim 11, further comprising upgrading the previously-qualified version of the unqualified component in a production environment to the qualified component based on the determination that the unqualified component is qualified.

20. The method of claim 11 wherein the unqualified component is an upgraded software version.

* * * * *